(12) United States Patent
Inoue et al.

(10) Patent No.: US 8,065,528 B2
(45) Date of Patent: Nov. 22, 2011

(54) AUTHENTICATION DEVICE, AUTHENTICATION METHOD, AUTHENTICATION PROGRAM AND COMPUTER READABLE RECORDING MEDIUM

(75) Inventors: Tomohiro Inoue, Otsu (JP); Masahiro Senga, Kyoto (JP)

(73) Assignee: OMRON Corporation, Kyoto (JP)

( * ) Notice: Subject to any disclaimer, the term of this patent is extended or adjusted under 35 U.S.C. 154(b) by 1098 days.

(21) Appl. No.: 11/724,584

(22) Filed: Mar. 15, 2007

(65) Prior Publication Data

US 2007/0220267 A1 Sep. 20, 2007

(30) Foreign Application Priority Data

Mar. 15, 2006 (JP) ................. 2006-071852

(51) Int. Cl.
*G06F 21/00* (2006.01)
(52) U.S. Cl. ............... 713/186; 382/115; 382/118
(58) Field of Classification Search ............ 382/115, 382/118; 902/3, 5, 6; 340/5.83, 5.82, 5.81, 340/5.53; 713/186
See application file for complete search history.

(56) References Cited

U.S. PATENT DOCUMENTS

| 6,959,874 B2 * | 11/2005 | Bardwell | 235/493 |
| 2004/0228505 A1 * | 11/2004 | Sugimoto | 382/118 |
| 2005/0178950 A1 | 8/2005 | Yoshida | |
| 2006/0093183 A1 | 5/2006 | Hosoi | |
| 2007/0113099 A1 | 5/2007 | Takikawa et al. | |

FOREIGN PATENT DOCUMENTS

| JP | 2005-63342 | 3/2005 |
| JP | 2005-236513 | 9/2005 |
| JP | 2005-310069 | 11/2005 |
| JP | 2006-040151 | 2/2006 |
| JP | 2006-330936 | 12/2006 |
| WO | 2004/072899 | 8/2004 |

OTHER PUBLICATIONS

European Search Report dated Jul. 27, 2007 issued in European Patent Application No. 07104017.4-2212, 4 pages.
Patent Abstracts of Japan, Publication No. 2006/6040151 dated Feb. 9, 2006, 1 page.
Patent Abstracts of Japan, Publication No. 2006/330936 dated Dec. 7, 2006, 1 page.
European Office Action for European Application No. 07104017.4-2212, mailed on Aug. 11, 2010 (4 pages).
Japanese Office Action for Japanese Application No. 2006-071852, mailed on Feb. 15, 2011 (6 pages).

* cited by examiner

*Primary Examiner* — Edward Zee
(74) *Attorney, Agent, or Firm* — Osha • Liang LLP

(57) ABSTRACT

An authentication device having high resistance to spoofing is provided. A portable telephone includes a camera, which is switched between a close up mode enabling photographing at close up and a normal photography mode, for imaging the person to be authenticated; an examining section for detecting whether or not the camera is in the close up mode, and a determining section for determining that the person to be authenticated is not the person in question if the examining section detects that the mode of the imaging unit of when imaging the person to be authenticated is not the close up mode.

3 Claims, 2 Drawing Sheets

AUTHENTICATION DEVICE, AUTHENTICATION METHOD, AUTHENTICATION PROGRAM AND COMPUTER READABLE RECORDING MEDIUM

BACKGROUND OF THE INVENTION

1. Field of the Invention

The present invention relates to an authentication device and authentication method for performing identity verification based on the imaged image of the person to be authenticated.

2. Description of the Related Art

The need for security strengthening is increasing with widespread use of portable terminals and strengthening of functions. In particular, ensuring of security is an absolute requirement when functions directly related to financial transactions such as electronic money are equipped.

In order to respond to such need, a living body authentication in which ensuring of security is easier is proposed in addition to security measures such as personal identification number and password of the prior art. Among them, face authentication is an identification method normally performed by people in ordinary living, and is often adopted since psychological resistance is small, it can be achieved with small investment since devices that can perform imaging are increasing with widespread use of CCD (Charge Coupled Device) camera etc.

The system including a portable terminal for performing face authentication includes a card user verifying system disclosed in Japanese Laid Open Publication No. 2005-063342 (Date of publication Mar. 10, 2005). In this system, the user images his/her face using the camera of the portable telephone right before using the credit card, and transmits the photograph of the face to the credit card company along with the input password. After confirming that the photograph of the face and the password are registered in the database, the credit card company permits the use of the credit card by the user during a predefined time.

SUMMARY OF THE INVENTION

In the conventional configuration, however, the authentication step can be performed even by a person other than the person in question by acquiring, beforehand, the photograph of the person in question, that is, the original person to be authenticated, and imaging the relevant photograph with the camera of the portable telephone connected to the authentication system.

Spoofing is easily carried out if the photograph of the face of person in question such as ID photo of driver's license and passport, snap shots etc. can be acquired. Snap shots are particularly easy to acquire. When using the portable telephone as the authentication device, spoofing can be easily carried out since the authenticating operation can be performed at a location that does not attract public attention.

In view of the above problems, the present invention aims to provide an authentication device and an authentication method having high resistance to spoofing.

In order to achieve the above aim, the authentication device of the present invention relates to an authentication device for performing identity verification by imaging a person to be authenticated, the authentication device including an imaging unit, switched between a close up mode enabling photographing at close up and a non-close up mode other than the close up mode, for imaging the person to be authenticated; a detecting unit for detecting whether or not the imaging unit is in the close up mode; and a determining unit for determining that the person to be authenticated is not the person in question if the detecting unit detects that the mode of the imaging unit of when imaging the person to be authenticated is the close up mode.

In order to achieve the above aim, the authentication method of the present invention relates to an authentication method by an authentication device for performing identity verification by imaging a person to be authenticated, the authentication method including the steps of imaging the person to be authenticated by an imaging unit in the authentication device; detecting whether the imaging unit in the imaging step is in a close up mode enabling photographing at close up; and determining that the person to be authenticated is not the person in question if detected that the imaging unit is in the close up mode in the detecting step.

When carrying out spoofing using an ID photo of a driver's license or a passport, a photo of the person in question (person to be originally authenticated) such as snap shot etc., authentication cannot be performed unless the relevant photo is brought close to the imaging means for imaging since the image (e.g., face) of the person in question in the relevant photo is small. The imaging means must be switched to the close up mode to take the photo as it will be out of focus in the normal imaging mode.

According to the above configuration, the imaging means for imaging the person to be authenticated can be switched between the close up mode and the non-close up mode, and the mode of the imaging means is detected by the detecting means. If the detecting means determines that the imaging means is in the close up mode when the imaging means images the person to be authenticated, the determining means assumes that there is a high possibility that the imaging target is a mimic of the photo etc. and not the actual image (e.g., face), and determines that the person to be authenticated is not the person in question.

Therefore, determination is made that the person to be authenticated is not the person in question if the person other than the person in question attempts to carry out spoofing by imaging the photo of the person in question with the imaging means in the close up mode. Consequently, the resistance to spoofing thus becomes higher.

Furthermore, the authentication device further includes a notifying means for notifying the determination result of the determining means, the notifying means preferably notifying the determination result of the determining means after a predetermined time after the determining means has determined that the person to be authenticated is not the person in question.

The time until the authentication result is provided of when the face of the person to be authenticated is imaged with the imaging means in a state capable of taking the photo at close up is shorter than when imaging in the non-close up mode. This is because the normal authentication process is performed when imaged in the non-close up mode.

Therefore, if the authentication failed result is immediately notified when the face of the person to be authenticated is imaged in the close up mode, the person pretending to be the person in question might suspect that the normal authentication process is not being performed. If suspecting that the normal authentication process is not being performed, such person may counterplot by using an enlarged photo etc.

According to such configuration, when the determining means determines that the person to be authenticated is not the person in question, such determination result is not immediately notified, and is notified by the notifying means after a predetermined time has elapsed.

Therefore, it becomes possible to fake that the normal authentication is being performed to the person pretending to be the person in question when the normal authentication process is not being performed, thereby reducing the possibility of spoofing being carried out again.

Furthermore, a program for operating the authentication device, the authentication program functioning the computer as each of the above units; and a computer readable recording medium recording the authentication program are also encompassed within the technical scope of the present invention.

Therefore, the authentication device according to the present invention has a configuration including an imaging unit, switched between a close up mode enabling photographing at close up and a non-close up mode other than the close up mode, for imaging the person to be authenticated; a detecting unit for detecting whether or not the imaging unit is in the close up mode; and a determining unit for determining that the person to be authenticated is not the person in question if the detecting unit detects that the mode of the imaging unit of when imaging the person to be authenticated is the close up mode.

The authentication method according to the present invention includes steps of imaging the person to be authenticated by an imaging unit of the authentication device; detecting whether the imaging unit in the imaging step is in a close up mode enabling photographing at close up; and determining that the person to be authenticated is not the person in question if detected that the imaging unit is in the close up mode in the detecting step.

Therefore, when the person other than the person in question (person to be originally authenticated) attempts to carry out spoofing by imaging the photo of the person in question with the imaging means in the close up mode, the person to be authenticated is determined as not the person in question, thereby reducing the possibility of mistaken authentication by spoofing.

DETAILED DESCRIPTION OF THE PREFERRED EMBODIMENTS

One embodiment of the present invention will now be described based on FIGS. 1 and 2. A portable telephone 1 will be described below as one example of the authentication device. In the portable telephone 1, a billing and settlement unit 11 executes the process of billing and settlement after the authentication of the user is performed and if the authentication is successful.

The billing and settlement unit 11 is one example of an application installed in the portable telephone 1, and thus may be other applications. For example, the billing and settlement unit 11 may be applications for transmitting and receiving e-mails, for managing entering into the room etc.

(Configuration of Portable Telephone 1)

Figure 1:
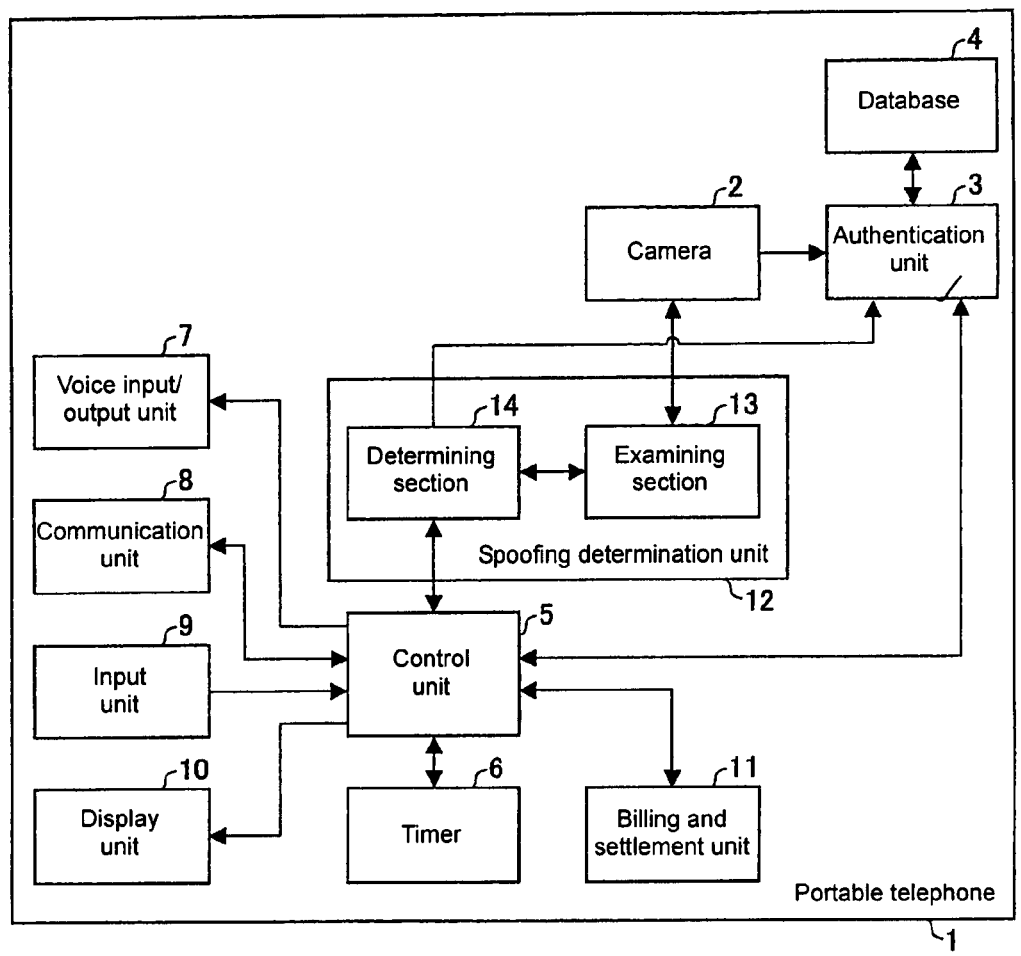
FIG. 1 shows a schematic view showing a configuration of a portable telephone of one embodiment.

FIG. 1 is a schematic view showing the configuration of the portable telephone 1. As shown in FIG. 1, the portable telephone 1 includes a camera 2 (imaging unit), an authentication unit 3, a database 4, a control unit 5, a voice input/output unit 7 including a microphone/speaker, a communication unit 8 for transmitting and receiving voice signal and data signal, the billing and settlement unit 11, and a spoofing determination unit 12.

The camera 2 is an imaging unit for imaging the image (hereinafter referred to as authentication image) of the face of the user, who is the person to be authenticated. The camera 2 is a CCD camera etc., and is switched between the normal photography mode (non-close up mode) and the close up mode. The user switches the photography mode of the camera 2 by way of the input unit 9. The camera 2 outputs the acquired authentication image to the authentication unit 3.

The method of switching the imaging mode of the camera 2 is not particularly limited, and the distance between the plurality of lenses may be changed, or the type of lens may be changed.

The camera 2 is preferably arranged on the surface on the same side as the surface arranged with the input unit 9 and the display unit 10 of the portable telephone 1 so that the user can easily take the picture of his/her face.

The image (hereinafter referred to as registered image), in which the face of the user is imaged, is stored in the database 4 in advance. The registered image may be acquired by the camera 2 or may be acquired by other cameras.

The authentication unit 3 matches the authentication image acquired by the camera 2 and the registered image stored in the database 4, and determines whether the person to be authenticated is the person in question based on the extent of similarity of the images.

The matching method in the authentication unit 3 is not particularly limited. For example, the similarity of the images may be calculated, and determination may be made on whether or not the similarity is within a predetermined threshold value to determine whether the person to be authenticated is the person in question.

The authentication unit 3 performs the matching process when receiving the matching command output from the control unit 5, and outputs the matching result to the control unit 5.

The spoofing determination unit 12 determines whether spoofing is being carried out based on the photography mode of the camera 2 of when the authentication image is imaged. The spoofing determination unit 12 includes an examining section 13 and a determining section 14.

The examining section 13 examines the photography mode of the camera 2 and outputs the photography mode information indicating whether the photography mode is the normal photography mode or the close up mode to the determining section 14. The camera 2 includes a storage medium (not shown) for storing the information of the flag indicating whether the photography mode is the normal photography mode or the close up mode, and the examining section 13 examines the photography mode of the camera 2 by referring to the value of the flag.

The determining section 14 receives the photography mode information from the examining section 13, and outputs the matching command commanding the matching process to the authentication unit 3 when the photography mode information indicates that the camera 2 is in the normal photography mode; and assumes that the imaging target is not the face of the actual person and thus determines that the person to be authenticated is not the person in question, and outputs a match prohibiting command indicating that the matching process is not permitted to the control unit 5 when the photography mode information indicates that the camera 2 is in the close up mode.

The billing and settlement unit 11 communicates with the server of the credit card company via the communication unit 8 when the authentication unit 3 determines that the person to be authenticated is the person in question, and performs a predetermined process for billing and settlement.

The control unit 5 receives the matching information indicating the matching result from the authentication unit 3, and outputs the authentication successful information indicating that the authentication was successful to the billing and settlement unit 11 when the matching information indicates that authentication was successful. The control unit 5 notifies the authentication failed result through the display unit 10 when authentication fails.

When receiving the match prohibiting command by the determining section 14, the control unit 5 notifies that authentication has failed through the display unit 10 after a predetermined time (hereinafter referred to as false time). The false time is measured by a timer 6.

The length of false time is preferably substantially the same as the time required for the matching process in the authentication unit 3. According to such configuration, the authentication result is notified at substantially the same timing as when the matching process is performed even if the matching process is not performed. Thus, the matching processes is made to appear as if being performed even when the matching process is not performed.

(Flow of Processes in The Portable Telephone 1)

One example of the flow of process in the portable telephone 1 will now be described with reference to FIG. 2. FIG. 2 is a flow chart showing the flow of the process in the portable telephone 1.

Figure 2:
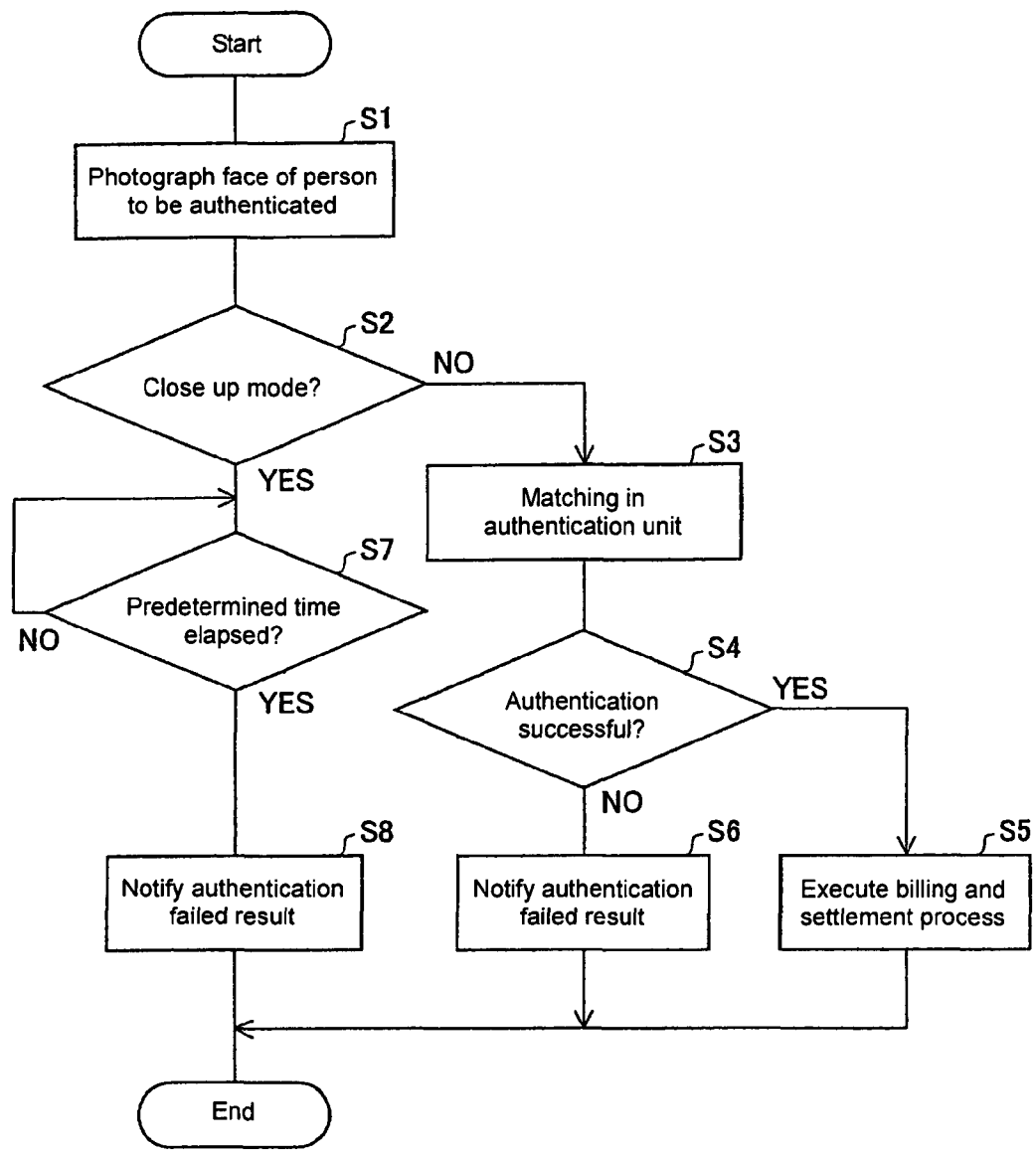
FIG. 2 shows a flow chart showing the flow of process in the portable telephone of one embodiment.

When the user (person to be authenticated) performs an operation to acquire the authentication image via the input unit 9, the face of the user is imaged by the camera 2 (imaging step) (S1), as shown in FIG. 2.

The examining section 13 examines whether the camera 2 is in the normal photography mode or the close up mode, and outputs the photography mode information to the determining section 14 (examining step) (S2).

If the photography mode information indicates normal photography mode, in other words, when the camera 2 is not in the close up mode (NO in S2), the determining section 14 determines that spoofing is not being carried out (determining step), and outputs the matching command to the authentication unit 3.

When receiving the matching command, the authentication unit 3 matches the authentication image output from the camera 2 and the registered image stored in the database 4, and determines whether the person to be authenticated is the person in question (S3). The authentication unit 3 then outputs the determination result to the control unit 5.

If authentication is successful (YES in S4), the control unit 5 outputs the authentication successful information to the billing and settlement unit 11.

When receiving the authentication successful information, the billing and settlement unit 11 performs a predetermined process for billing and settlement (S5).

If authentication fails (NO in S4), the control unit 5 notifies the authentication failed result through the display unit 10 (S6).

If the photography mode information indicates the close up mode (YES in S2), the determining section 14 determines that the person to be authenticated is not the person in question, and outputs the match prohibiting command to the control unit 5.

When receiving the match prohibiting command, the control unit 5 waits for a constant time to pass with reference to the timer 6 (S7).

After the constant time has elapsed (YES in S7), the control unit 5 notifies that authentication has failed through the display unit 10 (S8).

(Effect of Portable Telephone 1)

Therefore, the portable telephone 1 determines that the person to be authenticated is not the person in question when the face of the person to be authenticated is imaged by the camera 2 in the close up mode. Thus, authentication is not performed if spoofing is carried out by photographing the face of the person in question at close up. Therefore, the possibility of mistaken authentication due to spoofing is reduced.

The portable telephone 1 uses whether or not the camera 2 is in the close up mode in time of photographing the authentication image as the reference for determining whether spoofing is being carried out, and thus the portable telephone 1 can be realized by making minor changes to the conventional authentication device.

(Variant)

In the above configuration, the false time is created, and the authentication failed result is notified after the false time has elapsed, but the false time does not need to be created and the control unit 5 may notify the authentication failed result immediately after receiving the match prohibiting command from the determining section 14. The control unit 5 may also notify the authentication result by image through the display unit 10 or may notify the authentication result by voice through the speaker (not shown).

The control unit 5 references the timer 6 in the above configuration, but the match prohibiting command may be output to the control unit 5 after a predetermined time with the determining section 14 referencing the timer 6.

The function of the spoofing determination unit 12 may be incorporated in the control unit 5.

In the above configuration, the camera 2 has two modes of close up mode and normal mode (non-close up mode), but the camera 2 only needs to have at least one close up mode and at least one non-close up mode, and thus the type and number of photography modes are not particularly limited.

The authentication unit 3 and the database 4 may be arranged on the external device, and the match process may be performed by communicating the portable telephone 1 and the external device. The application corresponding to the billing and settlement unit 11 may be equipped by the external device that communicates with the portable telephone 1. The external device is a device possessed by the person who needs the authentication result of the user, and may be a computer or a server possessed by suppliers selling products or credit card companies.

The portable telephone 1 is given by way of example of the authentication device of the present invention in the above invention, but the authentication device merely needs to be a terminal device equipped with a camera, and may be a PDA (Personal Digital Assistant) or a personal computer equipped with the camera. The imaging unit and the main body of the authentication device may be integrally formed, or the imaging unit may be removably connected to the main body of the authentication device.

Each block of the portable telephone 1 may be configured by hardware logic, or may be realized by software using the CPU as described below.

That is, the portable telephone 1 includes a CPU (Central Processing Unit) for executing the command of the control program for realizing each function, a ROM (Read Only Memory) for storing the program, a RAM (Random Access Memory) for expanding the program, a storage device (recording medium) such as memory for storing the program and various data etc.

The aim of the present invention is also realized by supplying the recording medium, on which the program code (executable format program, intermediate code program, source program) of the control program of the portable telephone 1 or the software for realizing the above described function is computer readably recorded, to the portable telephone 1 and having the computer (or CPU or MPU) read and execute the program code stored on the recording medium.

The recording medium used may be tapes such as magnetic tape and cassette tape; discs including magnetic discs such as Floppy Disc®/hard disc and optical disc such as CD-ROM/MO/MD/DVD/CD-R; cards such as IC card (include memory card)/optical card; semiconductor memories such as mask ROM/EPROM/EEPROM/flash ROM etc.

The portable telephone 1 may be configured connectable to a communication network, and the program code may be supplied through the communication network. The communication network is not particularly limited, and internet, intranet, extranet, LAN, ISDN, VAN, CATV communication network, virtual private network, telephone line, mobile communication network, satellite communication network and the like may be used.

The transmission medium configuring the communication network is not particularly limited, and wired medium such as IEEE 1394, USB, power line carrier, cable TV line, telephone line, ADSL line; and wireless medium such as infrared line such as IrDA and remote controller, Bluetooth®, 802.11 wireless, HDR, portable telephone network, satellite line, terrestrial digital network and the like may be used. The present invention can be realized in the form of carrier wave or data signal train in which the program code is realized in electronic transmission.

The present invention is not limited to each of the above embodiment, and various modifications within the scope of the claims are possible, and it should be recognized that embodiments obtained by appropriately combining the technical means disclosed in each of the different embodiments are encompassed in the technical scope of the present invention.

The present invention is suitably applied to the authentication device for performing identity verification based on the image of the person to be authenticated since the possibility of mistaken authentication due to spoofing is reduced based on the photography mode of when imaging the person to be authenticated.

What is claimed is:

1. An authentication device for performing identity verification by imaging a person to be authenticated, the authentication device comprising:
   an imaging device, switched between a close up mode enabling photographing at close up and a non-close up mode other than the close up mode, for imaging the person to be authenticated;
   a detecting unit for detecting whether or not the imaging device is in the close up mode;
   a determining unit for determining that the person to be authenticated is not the person in question in any situation when the detecting unit detects that the mode of the imaging device of when imaging the person to be authenticated is the close up mode;
   an authentication unit for determining whether or not the person to be authenticated is the person in question when the detecting unit detects that the mode of the imaging device when imaging the person to be authenticated is the non-close up mode; and
   a notifying unit for notifying the determination result of the determining unit after a predetermined time after the determining unit determines that the person to be authenticated is not the person in question,
   wherein the predetermined time is substantially the same as a time required for a determination process in the authentication unit.

2. An authentication method by an authentication device for performing identity verification by imaging a person to be authenticated, the authentication method comprising the steps of:
   imaging the person to be authenticated by an imaging device of the authentication device;
   detecting whether the imaging device in the imaging step is in a close up mode enabling photographing at close up;
   determining that the person to be authenticated is not the person in question in any situation when it is detected that the imaging device is in the close up mode in the detecting step;
   determining whether or not the person to be authenticated is the person in question when the detecting unit detects that the mode of the imaging device when imaging the person to be authenticated is the non-close up mode; and
   notifying a result of the determining after a predetermined time after determining that the person to be authenticated is not the person in question,
   wherein the predetermined time is substantially the same as a time required for a determination process in the authentication unit.

3. A non-transitory computer readable recording medium containing an authentication program for causing a computer to implement an authentication method comprising the steps of:
   imaging the person to be authenticated by imaging unit of the authentication device;
   detecting whether the imaging unit in the imaging step is in a close up mode enabling photographing at close up;
   determining that the person to be authenticated is not the person in question in any situation when it is detected that the imaging unit is in the close up mode in the detecting step;
   determining whether or not the person to be authenticated is the person in question when the detecting unit detects that the mode of the imaging device when imaging the person to be authenticated is the non-close up mode; and
   notifying a result of the determining after a predetermined time after determining that the person to be authenticated is not the person in question,
   wherein the predetermined time is substantially the same as a time required for a determination process in the authentication unit.

* * * * *